(12) United States Patent
Mandos, III

(10) Patent No.: US 10,754,068 B2
(45) Date of Patent: Aug. 25, 2020

(54) LENS COATING SYSTEM

(71) Applicant: Engineered Outdoor Products, LLC, Loveland, CO (US)

(72) Inventor: James Mandos, III, Loveland, CO (US)

(73) Assignee: Engineered Outdoor Products, LLC, Loveland, CO (US)

(*) Notice: Subject to any disclaimer, the term of this patent is extended or adjusted under 35 U.S.C. 154(b) by 101 days.

(21) Appl. No.: 15/997,553

(22) Filed: Jun. 4, 2018

(65) Prior Publication Data
US 2019/0369293 A1 Dec. 5, 2019

(51) Int. Cl.
G02B 1/10 (2015.01)
G02B 1/115 (2015.01)
F41G 1/38 (2006.01)
F41G 11/00 (2006.01)

(52) U.S. Cl.
CPC .............. G02B 1/115 (2013.01); F41G 1/38 (2013.01); *F41G 11/003* (2013.01)

(58) Field of Classification Search
CPC ........ G02B 1/115; G02B 27/0149; F41G 1/38
USPC ................ 359/586, 588, 589, 590; 356/251; 42/119
See application file for complete search history.

(56) References Cited

U.S. PATENT DOCUMENTS

| | | | |
|---|---|---|---|
| 3,880,529 A * | 4/1975 | Althause | G02B 27/0149 356/251 |
| 5,745,292 A | 4/1998 | Jones | |
| 6,172,813 B1 | 1/2001 | Tadic-Galeb et al. | |
| 6,275,337 B1 | 8/2001 | Jones | |
| 7,236,655 B2 | 6/2007 | Momoki et al. | |
| 7,686,462 B2 | 3/2010 | Jones | |
| 2007/0159697 A1* | 7/2007 | Terayama | G02B 1/115 359/586 |
| 2009/0290219 A1* | 11/2009 | Terayama | G02B 1/115 359/586 |

\* cited by examiner

*Primary Examiner* — Audrey Y Chang
(74) *Attorney, Agent, or Firm* — Craig R. Miles; C R Miles P.C.

(57) ABSTRACT

A sighting system including a sighting axis which passes through one or more sighting elements each disposed at an angle to the sighting axis and which include coating comprising a plurality of layers which increase transmission of incident light along the sighting axis.

19 Claims, 11 Drawing Sheets

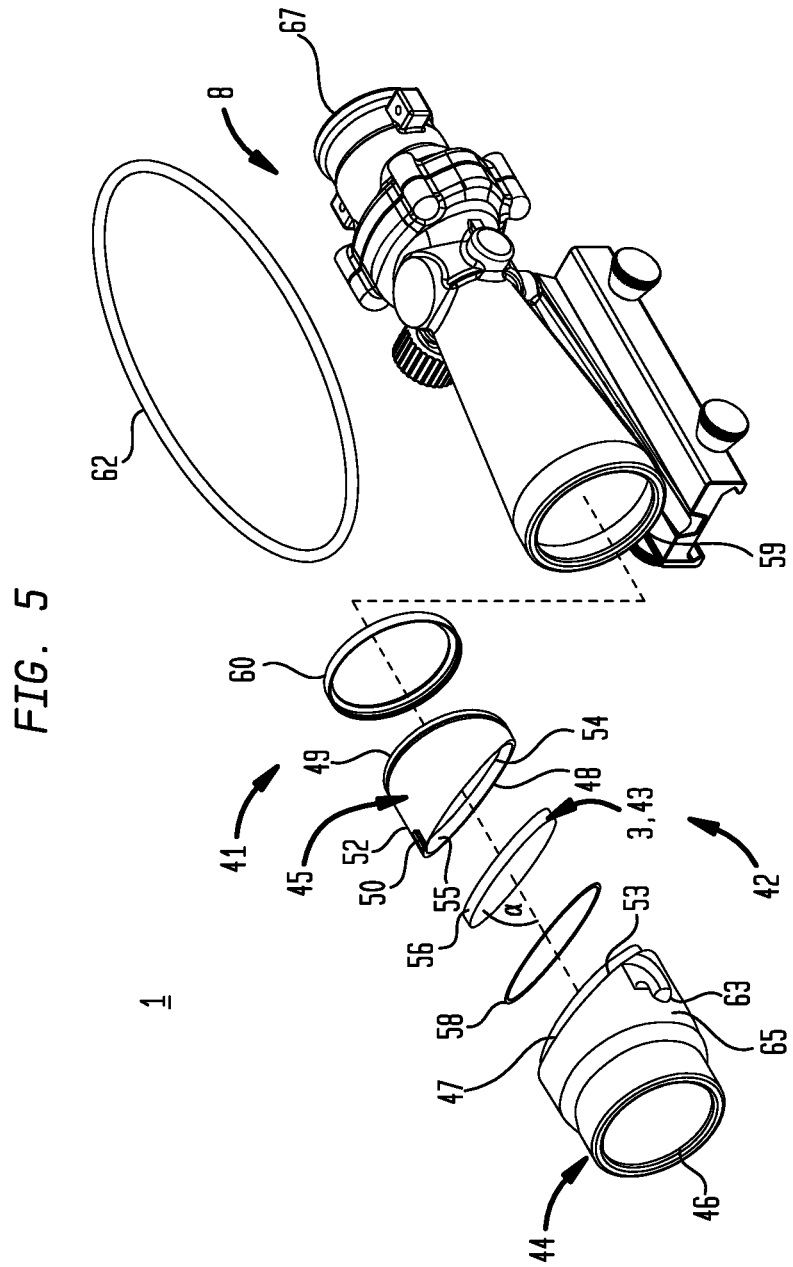

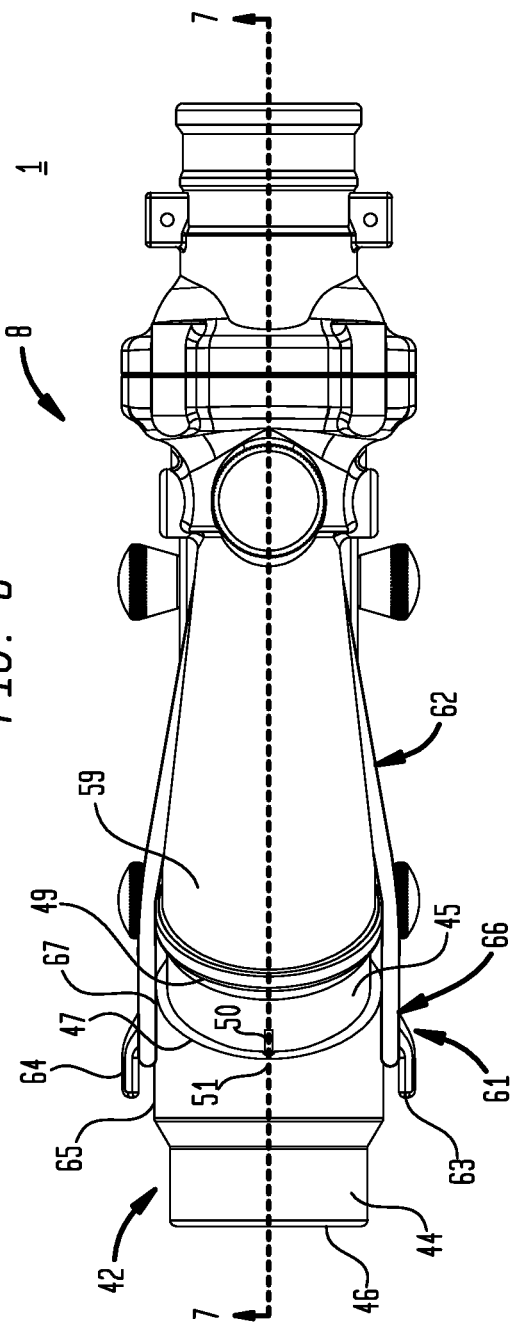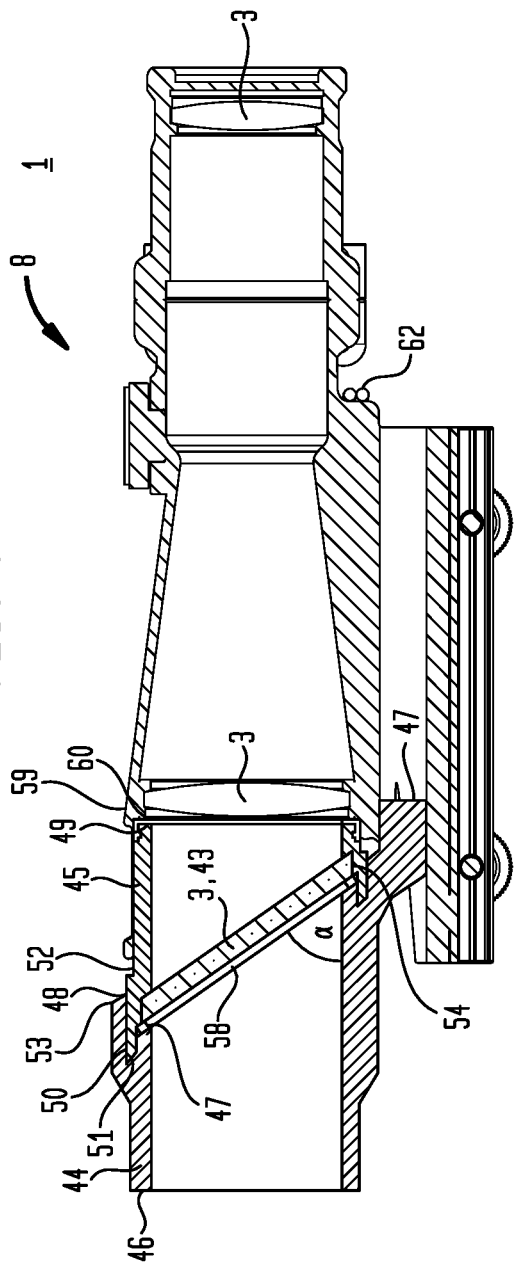

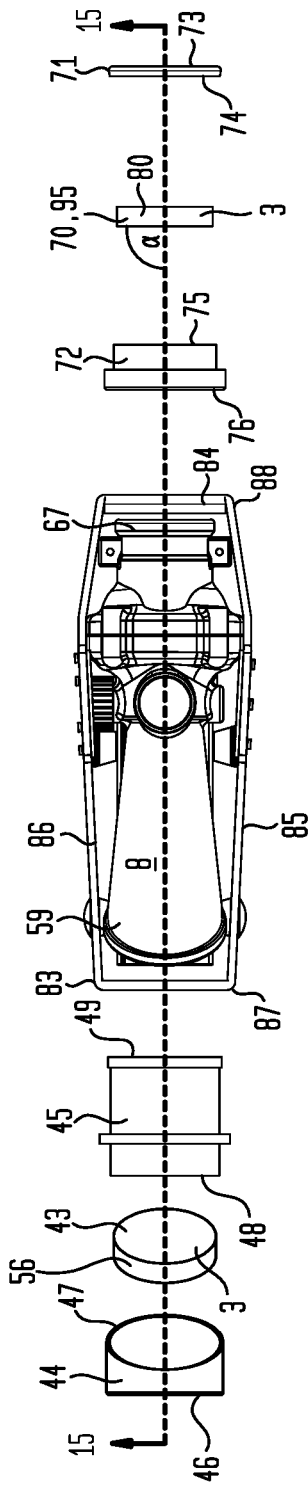
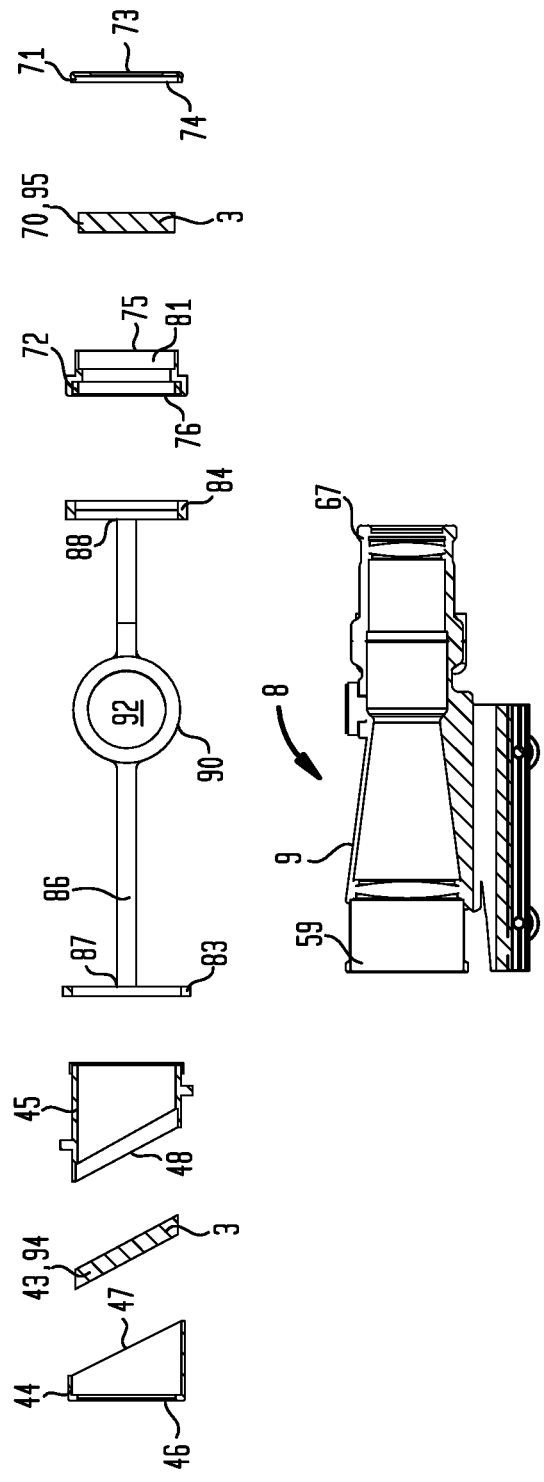
FIG. 14
FIG. 15

US 10,754,068 B2

LENS COATING SYSTEM

I. FIELD OF THE INVENTION

A sighting system including one or more sighting elements each disposed at an angle to a sighting axis and which include a coat having a plurality of layers which increase transmission of incident light along the sighting axis.

II. SUMMARY OF THE INVENTION

A broad object of the present invention can be to provide a device including a first substrate of $SiO_2$ having a coat including a sequentially deposited plurality of layers including four or more of $Al_2O_3$, $MgF_2$, $HfO_2$, $SiO_2$ and $TiO_2$, where the device can be disposed at an angle to the sighting axis of a sighting system to transmit incident light of about 400 nm to about 700 nm at greater than 98%.

Another broad object of the present invention can be to provide a method of making a device including sequentially depositing a plurality of layers including four or more of $Al_2O_3$, $MgF_2$, $HfO_2$, $SiO_2$ and $TiO_2$ on a first substrate of $SiO_2$, and disposing the device at an angle to the sighting axis of a sighting device to transmit incident light of about 400 nm to about 700 nm at greater than 98%.

Another broad object of the invention can be to provide a method of using a device including transmitting light along a sighting axis which passes through the device including a first substrate of $SiO_2$ having a coat including a sequentially deposited plurality of layers including four or more of $Al_2O_3$, $MgF_2$, $HfO_2$, $SiO_2$ and $TiO_2$, the device disposed at an angle of about 90 degrees or at an angle of about 45 degrees in relation to the sighting axis.

Another broad object of the invention can be to provide a retrofit system for use with a scope, the retrofit system including a device including a first substrate of $SiO_2$ having a coat including a sequentially deposited plurality of layers of four or more of $Al_2O_3$, $MgF_2$, $HfO_2$, $SiO_2$ and $TiO_2$, where the device can be fitted at an angle to the sighting axis of the scope to transmit incident light of about 400 nm to about 700 nm at greater than 98%.

Naturally, further objects of the invention are disclosed throughout other areas of the specification, drawings, photographs, and claims.

III. BRIEF DESCRIPTION OF THE DRAWINGS

FIG. 5 is an exploded perspective view of the particular embodiment of the inventive sighting system including the retrofit system shown in FIG. 4.

FIG. 6 is a top plan view of a particular embodiment of the inventive sighting system including the retrofit system fitted to a scope shown in FIG. 4.

FIG. 7 is a cross section view 7-7 of the particular embodiment of the inventive sighting system including the retrofit system fitted to a scope as shown in FIG. 6.

FIG. 14 is an exploded top plan view of the particular embodiment of the inventive sighting system including the retrofit system shown in FIG. 11.

FIG. 15 is an exploded cross section view 15-15 of the particular embodiment of the inventive sighting system including the retrofit system shown in FIG. 14.

IV. DETAILED DESCRIPTION OF THE INVENTION

Figure 1:
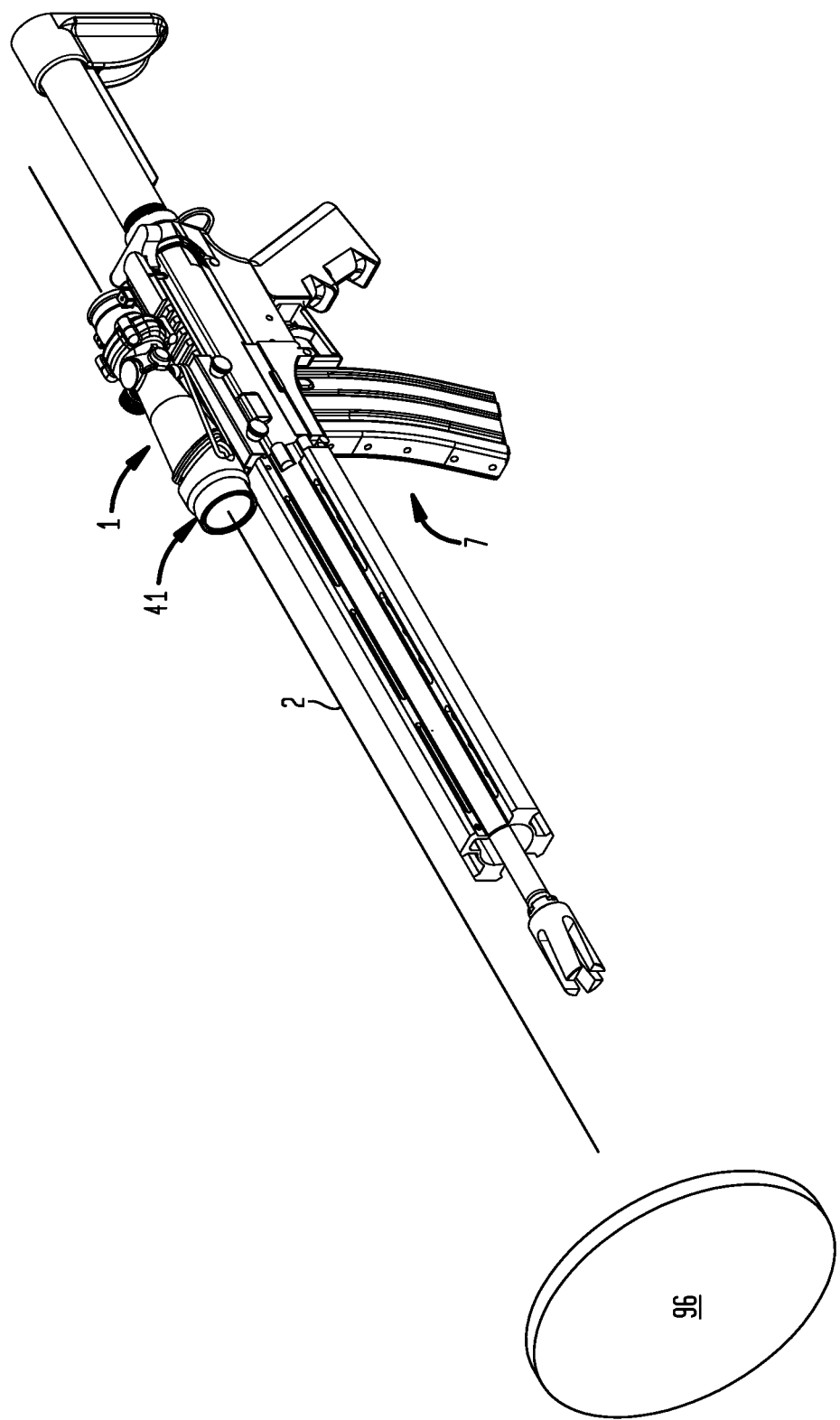
FIG. 1 is a perspective view of a particular embodiment of the inventive sighting system including a retrofit system attached to a scope mounted on a weapon.

Generally referring to FIGS. 1 through 16, a sighting system (1) including a sighting axis (2) which passes through one or more sighting elements (3) disposed at an angle (a) to the sighting axis (2) which can include a coating (4) having a plurality of layers (5) which increase transmission of incident light (6) along the sighting axis (2).

The term "sighting system (1)" is intended to broadly encompass any visualization apparatus or visualization method including one or more sighting elements (3) whether or not associated with a weapon (7); although particular embodiments of the sighting system (1) can be associated with or mounted to weapons (7) to increase accuracy or precision in aiming the weapon (7). For the purposes of this invention the term "weapon (7)" means any object capable of launching, firing, discharging, or otherwise expelling a projectile, or directing or projecting energy or beams. As illustrative examples: rifles, hand guns, shot guns, BB guns, pellet guns, laser weapons, energy weapons, bows, or the like.

Figure 2:
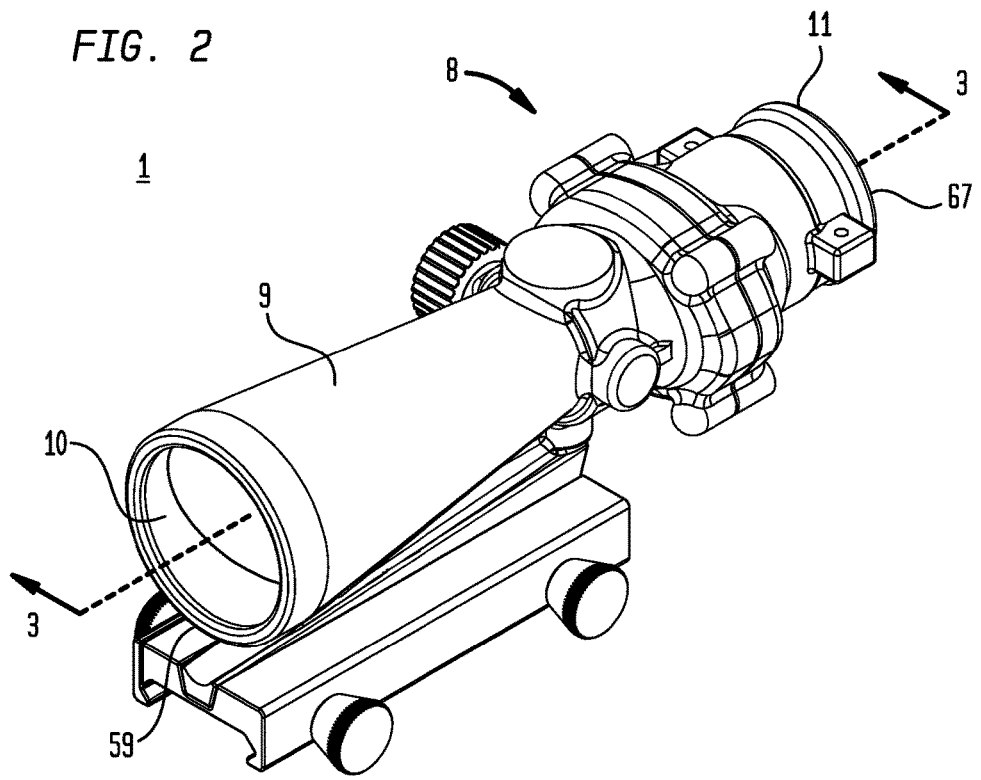
FIG. 2 is a perspective view of a particular embodiment of the inventive sighting system.
Figure 3:
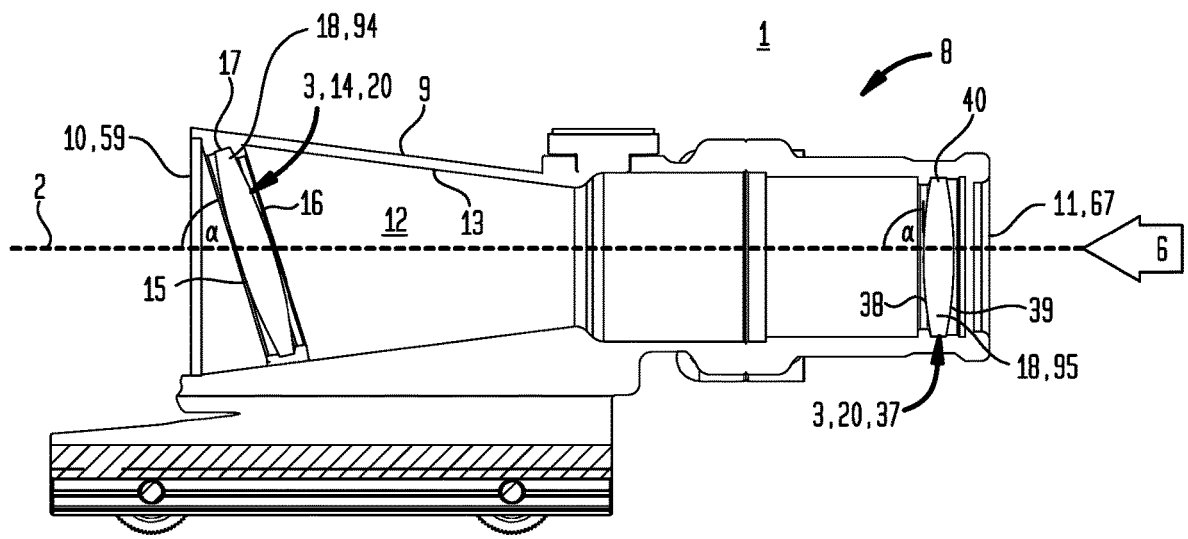
FIG. 3 is a cross section view 3-3 of the inventive sighting system shown in FIG. 2.
Figure 4:
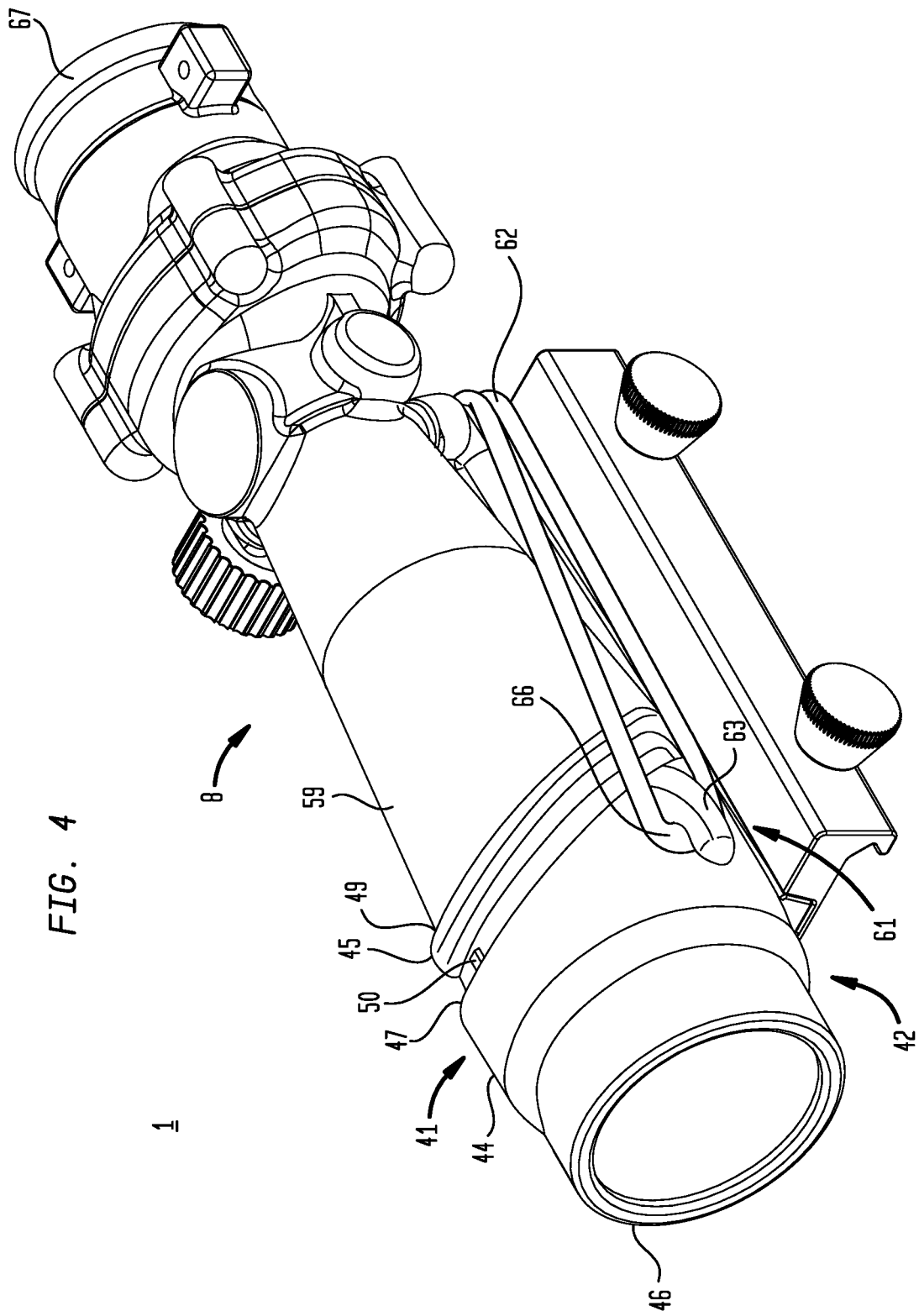
FIG. 4 is a perspective view of a particular embodiment of the inventive sighting system including a retrofit system fitted to a scope.
Figure 8:
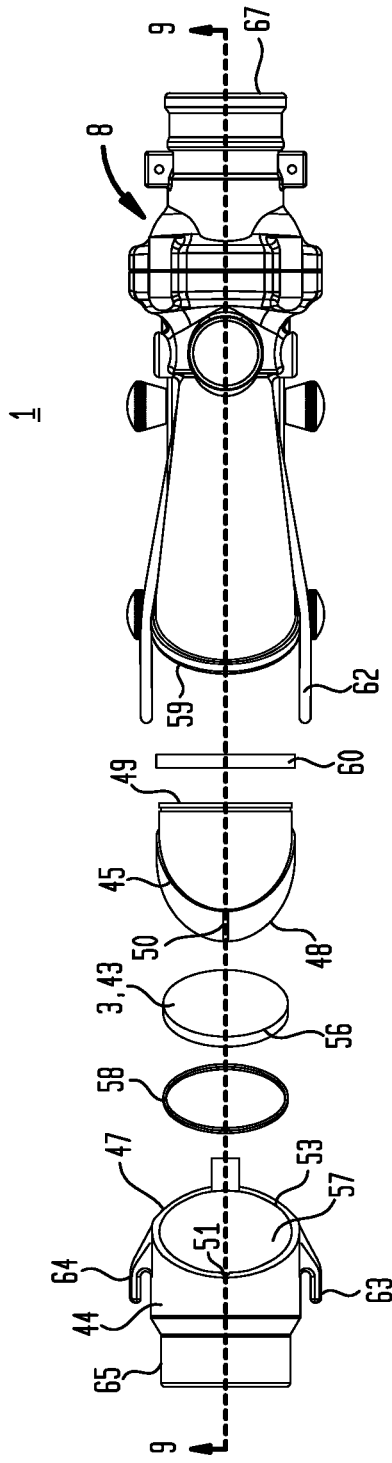
FIG. 8 is an exploded top plan view of the particular embodiment of the inventive sighting system including the retrofit system fitted to a scope as shown in FIG. 4.

Now referring primarily to FIGS. 2 and 3, in particular embodiments, the sighting system (1) can comprise an optical sighting device (also referred to as "a scope (8)"). The scope (8) can include a tubular housing (9) having a length disposed between a first open end (10) and a second open end (11). The first and second open ends (10) (11) can permit transmission of light (6) through the length of the tubular housing (9) from the first open end (10) to the second open end (11). The tubular housing (9) can have an interior space (12) defined by an internal surface (13) of the tubular housing (9).

Now referring primarily to FIG. 3, in particular embodiments, a first sight element (14) can be disposed in the interior space (12) of the tubular housing (9). The first sight element (14) can include a first surface (15) opposite a second surface (16), where both the first surface (15) and the second surface (16) extend to a first sight element perimeter (17). The first sight element perimeter (17) can circumferentially engage the internal surface (13) of the tubular housing (9), and be secured at a fixed location in the interior space (12) of the tubular housing (9) by one or more of mated engagement of the first sighting element (14) and the tubular housing (9), mechanical fasteners, interference fit, application of adhesive, or the like. In particular embodiments, the first sight element (14) can be disposed within the interior space (12) at an angle (a) in relation to the sighting axis (2) of the tubular housing (9). The angle (a) to the sighting axis (2) can be about 30 degrees to about 60 degrees. In particular embodiments, the angle (a) can be selected from the group including or consisting of: about 31 degrees to about 34 degrees, about 32 degrees to about 36 degrees, about 34 degrees to about 38 degrees, about 36 degrees to about 40 degrees, about 38 degrees to about 42 degrees, about 40 degrees to about 44 degrees, about 42 degrees to about 46 degrees, about 44 degrees to about 48 degrees, about 46 degrees to about 50 degrees, about 48 degrees to about 52 degrees, about 50 degrees to about 54 degrees, about 52 degrees to about 56 degrees, about 54 degrees to about 58 degrees, about 56 degrees to about 59 degrees, or combinations thereof.

Figure 16:
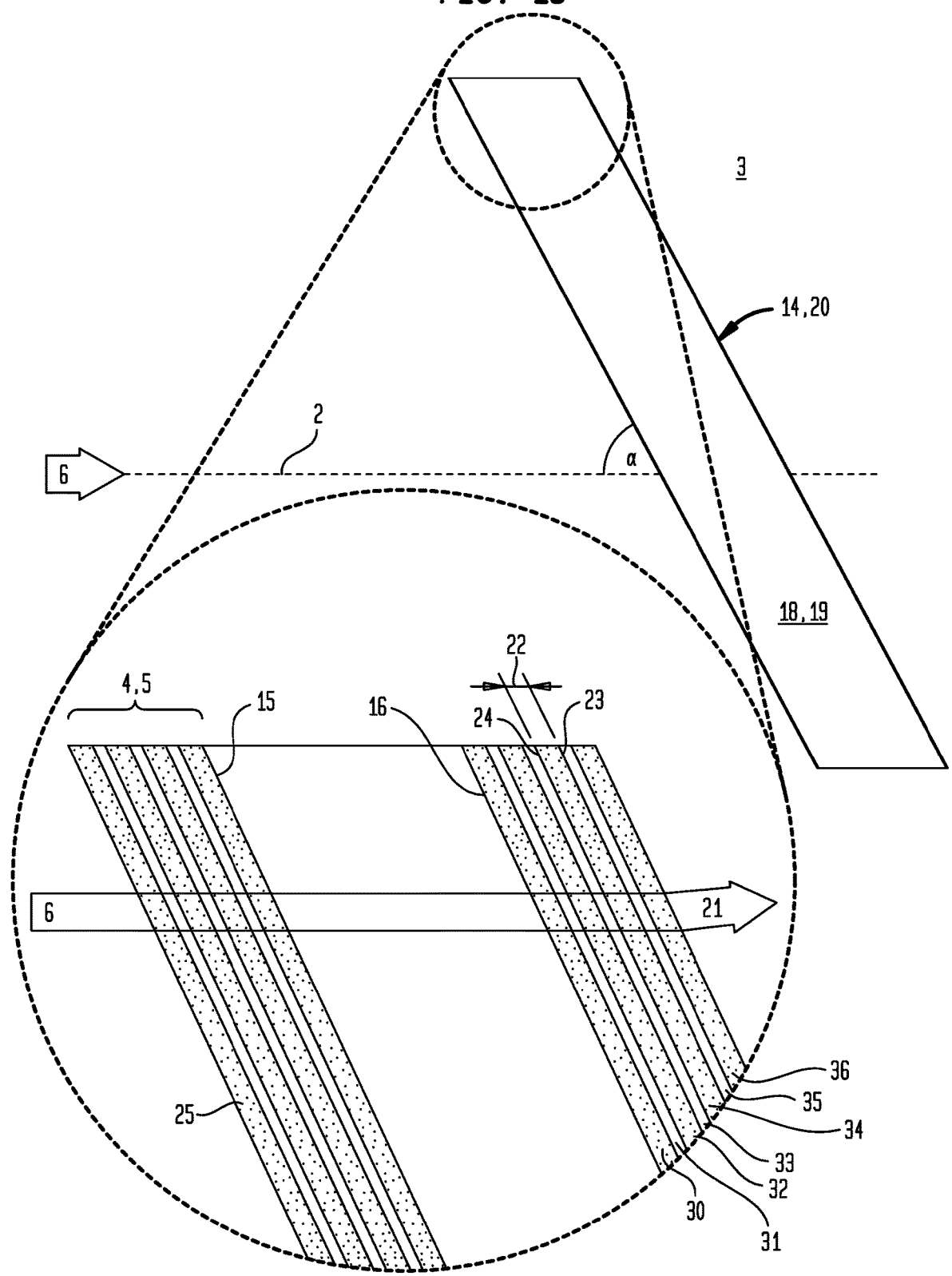
FIG. 16 is a side elevation view of a particular embodiment of a substrate having a coating including a sequentially deposited plurality of layers.

Again, referring primarily to FIGS. 2, 3 and 16, the first sight element (14) can comprise a substrate (18) of optically clear material including or consisting of: glass, plastic, crystal, polycarbonate, acrylic, cellulose triacetate, zinc sulfide, soda lime, borosilicate, sapphire, rutile, quartz, or like material, or combinations thereof. In particular embodiments, the substrate (18) can, but need not necessarily, be $SiO_2$ (19). In particular embodiments, the substrate (18) can, but need not necessarily, be configured as a lens (20). The substrate (18) can have a refractive index (21) of between about 1.3 and about 1.6. In particular embodiments, the refractive index (21) of the substrate (18)(19) can be selected from the group consisting of: about 1.31 to about 1.40, about 1.35 to about 1.45, about 1.4 to about 1.5, about 1.45 to about 1.55, and about 1.5 to about 1.6, or combinations thereof.

Now referring primarily to FIGS. 2, 3 and 16, a coating (4) can be deposited on the substrate (18) of the first sight element (14). The coating (4) can be deposited on the first surface (15), the second surface (16), or both surfaces (15)(16) of the first sight element (14). The coating (4) can comprise a plurality of layers (5) sequentially deposited onto the substrate (18). Each of the plurality of layers (5) of the coating (4) can be characterized by one or both of a physical thickness (22) and a refractive index (21). For purposes of this invention, the term "physical thickness" (22) means the measured distance between a layer first surface (23) opposite a layer second surface (24). For the purposes of this invention, the term "refractive index (21)" means the ratio of the speed of light in a vacuum to the speed of light in a second medium of greater density.

In particular embodiments, incident light (6) can strike the outermost layer (25) of the coating (4) and travel through the coating (4) and substrate (18) of the first sight element (14). As the incident light (6) travels through the coating (4) and substrate (18), the incident light (6) can be: transmitted through the coating (4) and substrate (18), reflected by the coating (4) and substrate (18), absorbed by the coating (4) and substrate (18), or scattered by the coating (4) and substrate (18). The refractive index (21) and physical thickness (22) of each of the plurality of layers (5) can affect the percentage of the incident light (6) transmitted, reflected, absorbed, or scattered by the coating (4) and the substrate (18) or the first sight element (14) as a whole.

In particular embodiments, the plurality of layers (5) in a coating (4) can be deposited in a sequential order which affords the substantial advantage of reducing reflected, absorbed or scattered incident light (6) and increasing transmission of incident light (6) through the first sight element (14) at greater than about 98 percent ("%"). In particular embodiments, the plurality of layers (5) can be deposited in a sequential order to provide a transmission of the incident light (6) selected from the group including or consisting of: greater than about 98.5%, greater than about 99.0%, greater than about 99.5% or combinations thereof. Correspondingly, the plurality of layers (5) can be deposited in a sequential order providing for a combination of reflected, scattered, and absorbed incident light of about 2%. In other particular embodiments the plurality of layers (5) can be deposited in a sequential order providing a combination of reflected, scattered, and absorbed incident light selected from the group including or consisting of: about 1.5%, about 1.0%, and about 0.5%, or a combination thereof.

Now referring primarily to FIG. 16, each of the plurality of layers (5) can be selected from the group of materials including or consisting of: $SiO_2$ (CAS No. 7631-86-9) (19), $TiO_2$ (CAS No. 13463-67-7) (26), $Al_2O_3$ (CAS No. 1344-28-1) (27), $HfO_2$ (CAS No. 12055-23-1) (28), or $MgF_2$ (CAS No. 7783-40-6) (29). To deposit the material, conventional methods can be used, including as illustrative examples: vacuum deposition, resistive source evaporation, electron beam thermal evaporation, ion-assisted deposition, electron beam physical vapor deposition, pulsed laser deposition, dip coating, spin coating, or combinations thereof.

In particular embodiments, the plurality of layers (5) of the coating (4) can include or consist of four or more layers (5) of $Al_2O_3$ (27), $MgF_2$ (29), $HfO_2$ (28), $SiO_2$ (19) or $TiO_2$ (26) sequentially deposited on a first substrate of $SiO_2$ (19). While the following illustrative example includes a coating (4) including a plurality of seven layers; this is not intended to obviate embodiments having a lesser plurality of layers (5) selected from the group including or consisting of: two layers, three layers, four layers, five layers, six layers, and seven layers, or combinations thereof.

In particular embodiments, the first layer (30) deposited on the first substrate (18), can be $Al_2O_3$ (27). The physical thickness (22) of the first layer (30) can be about 93 nanometers (nm) to about 114 nm. In particular embodiments, the physical thickness (22) of the first layer (30) can be selected from the group including or consisting of: about 94 nm to about 98 nm, about 96 nm to about 100 nm, about 98 nm to about 102 nm, about 100 nm to about 104 nm, about 102 nm to about 106 nm, about 104 nm to about 108 nm, about 106 nm to about 110 nm, about 108 nm to about 112 nm, about 110 nm to about 113 nm, or combinations thereof. The refractive index (21) of the first layer (30) can be between about 1.5 and about 1.8. In particular embodiments, the refractive index (21) of the first layer (30) can be selected from the group consisting of: about 1.55 to about 1.60, about 1.55 to about 1.65, about 1.60 to about 1.70, about 1.65 to about 1.75, and about 1.70 to about 1.75, or combinations thereof.

The second layer (31), deposited on the first layer (30), can be $MgF_2$ (29). The physical thickness (22) of the second layer (31) can be about 5.2 nm to about 6.3 nm. In particular embodiments, the physical thickness (22) of the second layer (31) can be selected from the group including or consisting of: about 5.25 nm to about 5.45 nm, about 5.35 nm to about 5.55 nm, about 5.45 nm to about 5.65 nm, about 5.55 nm to about 5.75 nm, about 5.65 nm to about 5.85 nm, about 5.75 nm to about 5.95 nm, about 5.85 nm to about 6.05 nm, about 5.95 nm to about 6.15 nm, about 6.05 nm to about 6.25 nm, or combinations thereof. The refractive index (21) of the second layer (31) can be about 1.2 to about 1.5. In particular embodiments, the refractive index (21) can be selected from the group consisting of: about 1.26 to about 1.30, about 1.275 to about 1.325, about 1.30 to about 1.35, about 1.325 to about 1.375, about 1.35 to about 1.40, about 1.375 to about 1.425, about 1.40 to about 1.45, about 1.425 to about 1.475, and about 1.45 to about 1.50, or combinations thereof.

The third layer (32), deposited on the second layer (31), can be HfO$_2$ (28). The physical thickness (22) of the third layer (32) can be about 18.0 nm to about 22.0 nm. In particular embodiments the physical thickness (22) of the third layer (32) can be selected from the group including or consisting of: about 18.5 nm to about 19.5 nm, about 19 nm to about 20 nm, about 19.5 nm to about 20.5 nm, about 20 nm to about 21 nm, and about 20.5 nm to about 21.5 nm, or combinations thereof. The refractive index (21) of the third layer (32) can be about 1.7 to about 2.1. In particular embodiments, the refractive index (21) of the third layer (32) can be selected from the group including or consisting of: about 1.8 to about 1.9, about 1.85 to about 1.95, about 1.9 to about 2.0, about 1.95 to about 2.05, about 2.0 to about 2.1, or combinations thereof.

The fourth layer (33), deposited on the third layer (32), can be SiO$_2$ (19). The physical thickness (22) of the fourth layer (33) can be about 119.7 nm to about 146.3 nm. In particular embodiments, the physical thickness (22) of the fourth layer (33) can be selected from the group including or consisting of: about 120 nm to about 125 nm, about 122.5 nm to about 127.5 nm, about 125 nm to about 130 nm, about 127.5 nm to about 132.5 nm, about 130 nm to about 135 nm, about 132.5 nm to about 137.5 nm, about 135 nm to about 140 nm, about 137.5 nm to about 142.5 nm, about 140 nm to about 145 nm, or combinations thereof. The refractive index (21) of the fourth layer (33) can be between about 1.3 and about 1.6. In particular embodiments, the refractive index (21) of the fourth layer (33) can be selected from the group consisting of: about 1.32 to about 1.4, about 1.35 to about 1.45, about 1.4 to about 1.5, about 1.45 to about 1.55, and about 1.5 to about 1.6, or combinations thereof.

The fifth layer (34), deposited on the fourth layer (33), can be Al$_2$O$_3$ (27). The physical thickness (22) of the fifth layer (34) can be about 50.3 nm to about 61.5 nm. In particular embodiments, the physical thickness (22) of the fifth layer (34) can be selected from the group including or consisting of: about 51 nm to about 53 nm, about 52 nm to about 54 nm, about 53 nm to about 55 nm, about 54 nm to about 56 nm, about 55 nm to about 57 nm, about 56 nm to about 58 nm, about 57 nm to about 59 nm, about 58 nm to about 60 nm, about 59 nm to about 61 nm, or combinations thereof. The refractive index (21) of the fifth layer (34) can be between about 1.5 and about 1.8. In particular embodiments, the refractive index (21) of the fifth layer (34) can be selected from the group consisting of: about 1.525 to about 1.575, about 1.55 to about 1.6, about 1.575 to about 1.625, about 1.6 to about 1.65, about 1.625 to about 1.675, about 1.65 to about 1.7, about 1.675 to about 1.725, about 1.7 to about 1.75, about 1.725 to about 1.775, about 1.75 to about 1.8, and about 1.775 to about 1.825, or combinations thereof.

The sixth layer (35), deposited on the fifth layer (34), can be TiO$_2$ (26). The physical thickness (22) of the sixth layer (35) can be about 89.7 nm to about 109.6 nm. In particular embodiments, the physical thickness (22) of the sixth layer (35) can be selected from the group including or consisting of: about 90 nm to about 92 nm, about 91 nm to about 93 nm, about 92 nm to about 94 nm, about 93 nm to about 95 nm, about 94 nm to about 96 nm, about 95 nm to about 97 nm, about 96 nm to about 98 nm, about 97 nm to about 99 nm, about 98 nm to about 100 nm, about 99 nm to about 101 nm, about 100 nm to about 102 nm, about 101 nm to about 103 nm, about 102 nm to about 104 nm, about 103 nm to about 105 nm, about 104 nm to about 106 nm, about 105 nm to about 107 nm, about 106 nm to about 108 nm, about 107 nm to about 109 nm, or combinations thereof. The refractive index (21) of the sixth layer (35) can be between about 2.1 and about 2.6. In particular embodiments, the refractive index (21) of the sixth layer (35) can be selected from the group consisting of: about 2.15 to about 2.25, about 2.2 to about 2.3, about 2.25 to about 2.35, about 2.3 to about 2.4, about 2.35 to about 2.45, about 2.4 to about 2.5, about 2.45 to about 2.55, or combinations thereof.

The seventh layer (36), deposited on the sixth layer (35), can be SiO$_2$ (19). The physical thickness (22) of the seventh layer (36) can be about 75.4 nm to about 92.1 nm. In particular embodiments, the physical thickness (22) of the seventh layer (36) can be selected from the group including or consisting of: about 76 nm to about 80 nm, about 77.5 nm to about 82.5 nm, about 80 nm to about 85 nm, about 82.5 nm to about 87.5 nm, about 85 nm to about 90 nm, or combinations thereof. The refractive index (21) of the seventh layer (36) can be between about 1.3 and about 1.6. In particular embodiments, the refractive index (21) of the seventh layer (36) can be selected from the group consisting of: about 1.32 to about 1.4, about 1.35 to about 1.45, about 1.4 to about 1.5, about 1.45 to about 1.55, and about 1.5 to about 1.6, or combinations thereof.

Again, referring primarily to FIGS. 2, 3 and 16, the substrate (18) including a sequentially deposited seven layers (5), as above described, can be configured as a lens (20) is as described in Example 1.

Example 1. As One Illustrative Example a Lens (20) can have a Seven Layer Coat (4), Having a Structure as Follows

| Layer Material | Physical Thickness (Ang) | Refractive Index |
| --- | --- | --- |
| Al$_2$O$_3$ | 104.25 | 1.66426 |
| MgF$_2$ | 5.77 | 1.38488 |
| HfO$_2$ | 20.01 | 1.93402 |
| SiO$_2$ | 133.04 | 1.46085 |
| Al$_2$O$_3$ | 55.89 | 1.66426 |
| TiO$_2$ | 99.66 | 2.33186 |
| SiO$_2$ | 83.77 | 1.46085 |

Again, referring primarily to FIGS. 2, 3, and 16, particular embodiments can, but need not necessarily, include a second sight element (37) disposed in the tubular housing (9) a distance from the first sight element (14). The second sight element (37) can include a second sight element first surface (38) opposite a second sight element second surface (39), where both the second sight element first surface (38) and a second sight element second surface (39) which extend to a second sight element perimeter (40). The second sight element perimeter (40) can circumferentially engage the internal surface (13) of the tubular housing (9) and be secured at a fixed location in the interior space (12) of the tubular housing (9) by one or more of mated engagement of the first sighting element (14) and the tubular housing (9), mechanical fasteners, friction fit, application of adhesive, or the like. The second sight element (37) can, but need not necessarily, be disposed at an angle (α) generally orthogonal to the sighting axis (2) of the tubular housing (9).

The second sight element (37) can be formed from a substrate (18). The substrate (18) can be an optically clear material including or consisting of: glass, plastic, crystal, polycarbonate, acrylic, cellulose triacetate, zinc sulfide, soda lime, borosilicate, sapphire, rutile, quartz, or like material, or combinations thereof. In particular embodiments, the substrate (18) can be $SiO_2$ (19). In particular embodiments, the substrate (18) can be configured as a lens (20). The refractive index (21) of the substrate (18) can be between about 1.3 and about 1.6. In particular embodiments, the refractive index (21) of the substrate (18) can be selected from the group consisting of: about 1.32 to about 1.4, about 1.35 to about 1.45, about 1.4 to about 1.5, about 1.45 to about 1.55, about 1.5 to about 1.6, or combinations thereof.

In particular embodiments, the second sight element (37) can, but need not necessarily, have a coating (4). The coating (4) can be deposited on the second sight element first surface (38), the second sight element second surface (39), or both surfaces (38)(39) of the second sight element (37). The coating (4) can comprise a plurality of layers (5) sequentially deposited onto the substrate. Each of the plurality of layers (5) can be deposited in a sequential order to afford transmission of incident light of greater than or about equal to 98%. In other particular embodiments, the plurality of layers (5) can be deposited in sequential order to afford a transmission of incident light (6) selected from the group including or consisting of: greater than 98.5%, of greater than 99.0%, and of greater than 99.5% or combinations thereof. Each of the plurality of layers (5) can be selected from the group of materials including or consisting of: $SiO_2$ (19), $TiO_2$ (26), $Al_2O_3$ (27), $HfO_2$ (28), and $MgF_2$ (29). Each of the plurality of layers (5) can, but need not necessarily, be deposited onto the substrate by one or more of: vacuum deposition, resistive source evaporation, electron beam thermal evaporation, ion-assisted deposition, electron beam physical vapor deposition, pulsed laser deposition, dip coating, spin coating, or combinations thereof. In particular embodiments, the coating (4) can include seven layers (5) sequentially deposited on the substrate (18), where the plurality of layers (5) on the substrate (18) provide a transmission of incident light (6) of greater than or about equal to 98%. In other particular embodiments, the plurality of layers (5) can be deposited in a sequential order providing a transmission of incident light selected from the group including or consisting of: greater than 98.5%, of greater than 99.0%, and of greater than 99.5% or combinations thereof. The plurality of layers (5) of the coating (4) of the second sight element (37) can be sequentially deposited as described above.

Now referring generally to FIGS. 4 through 16, particular embodiments of a sighting system (1) can include a retrofit system (41) for use with a scope (8). For the purposes of the illustrative example of FIGS. 4 through 9, the term "scope" means a telescopic sight mountable on a weapon (7); however, this is not intended to preclude the use of the first and second sight elements (14)(37) as described herein in other scopes such as: telescopes, microscopes, monoculars, binoculars, or other sighting assemblies. Referring primarily to FIGS. 4 through 9, the retrofit system (41) can include an objective end (42). The objective end (42) can include an objective substrate (43) secured between first and second objective tubular housings (44)(45). The first objective tubular housings (44) can have a length disposed between objective tubular housing first and second ends (46)(47). The second objective tubular housing (45) can have a length disposed between second objective tubular housing first and second ends (48)(49). The first objective tubular housing (44) can be coupled to the second objective tubular housing (45). While the illustrative example of FIG. 7, shows the second objective tubular housing first end (48) slidingly telescopingly engaged within the first objective tubular housing second end (47); this is not intended to preclude embodiments in which the first and second objective tubular housings (44)(45) mate by interference fit, mateable threads, mechanical fasteners, or other like methods.

In particular embodiments, rotational alignment of the first objective tubular housing (44) to the second objective tubular housing (45) can be achieved by mateable engagement of a key (50) in a keyway (51). The second objective tubular housing first end (48) can include a key (50) disposed in the peripheral margin (52) of the second objective tubular housing first end (48). The first objective tubular housing second end (47) can include a keyway (51) disposed in the peripheral margin (53) of the first objective tubular housing second end (47). The key (50) can be rotationally aligned and matingly engaged to the keyway (51).

Figure 9:
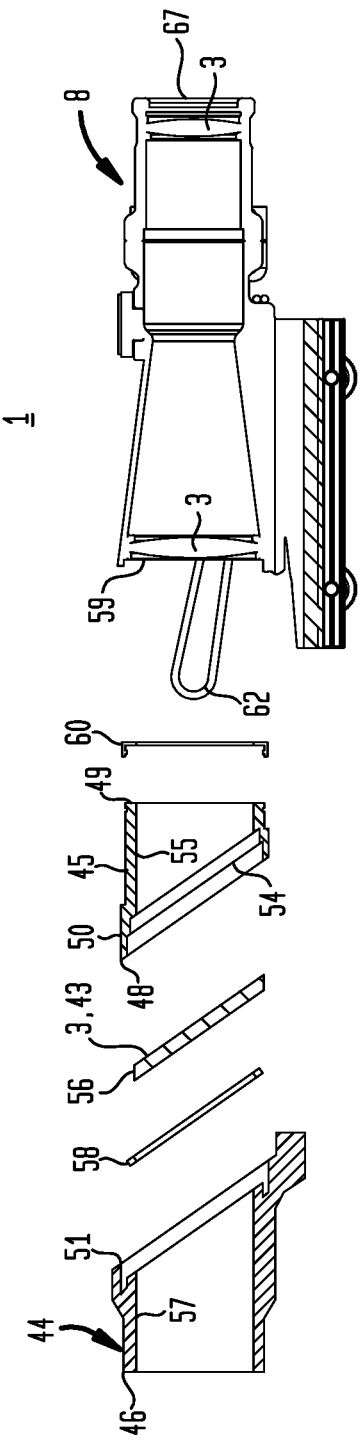
FIG. 9 is an exploded cross section view 9-9 of the particular embodiment of the inventive sighting system including the retrofit system as shown in FIG. 8.
Figure 10:
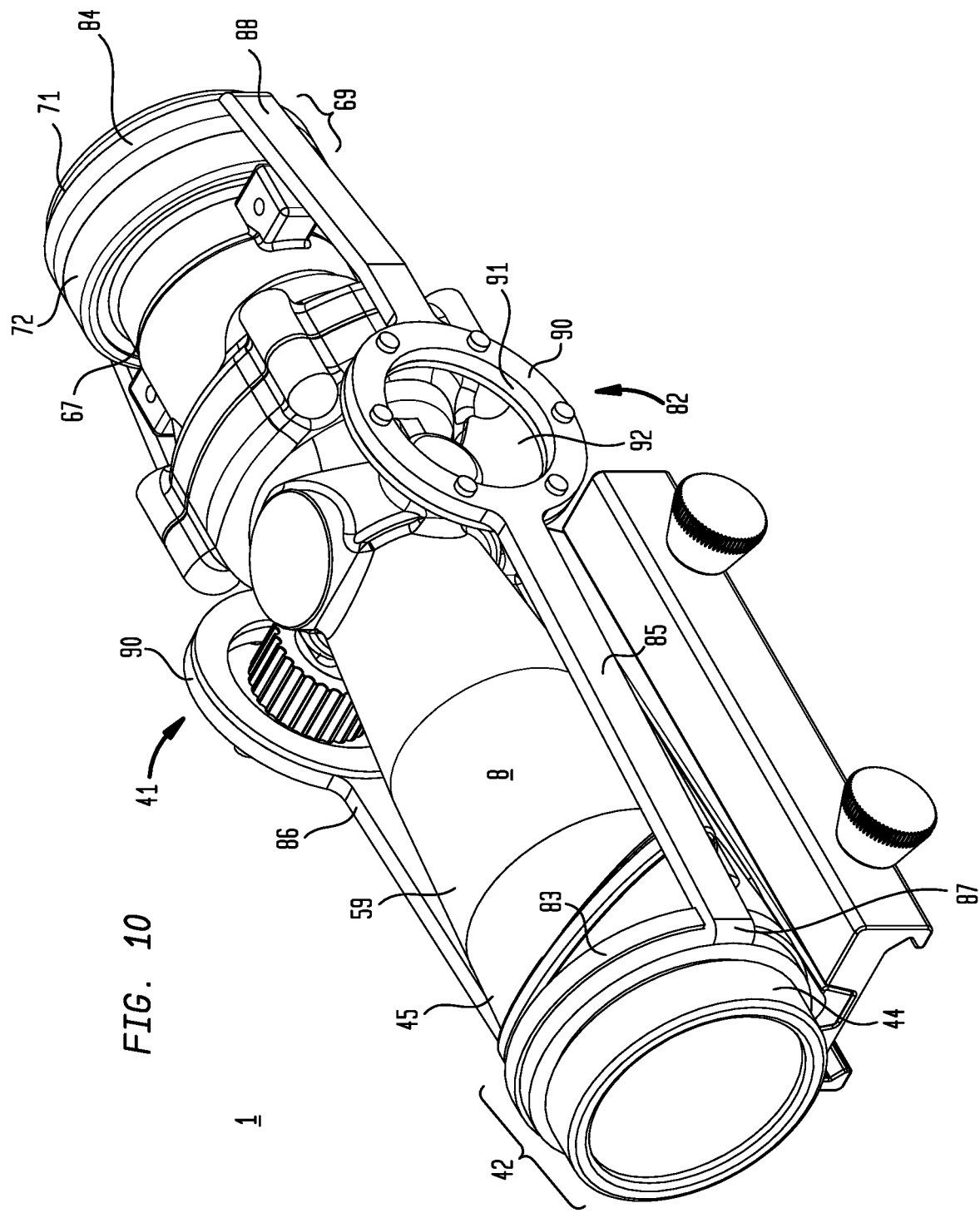
FIG. 10 is a perspective view of a particular embodiment of the inventive sighting system including a particular embodiment of a retrofit system fitted to a scope.
Figure 11:
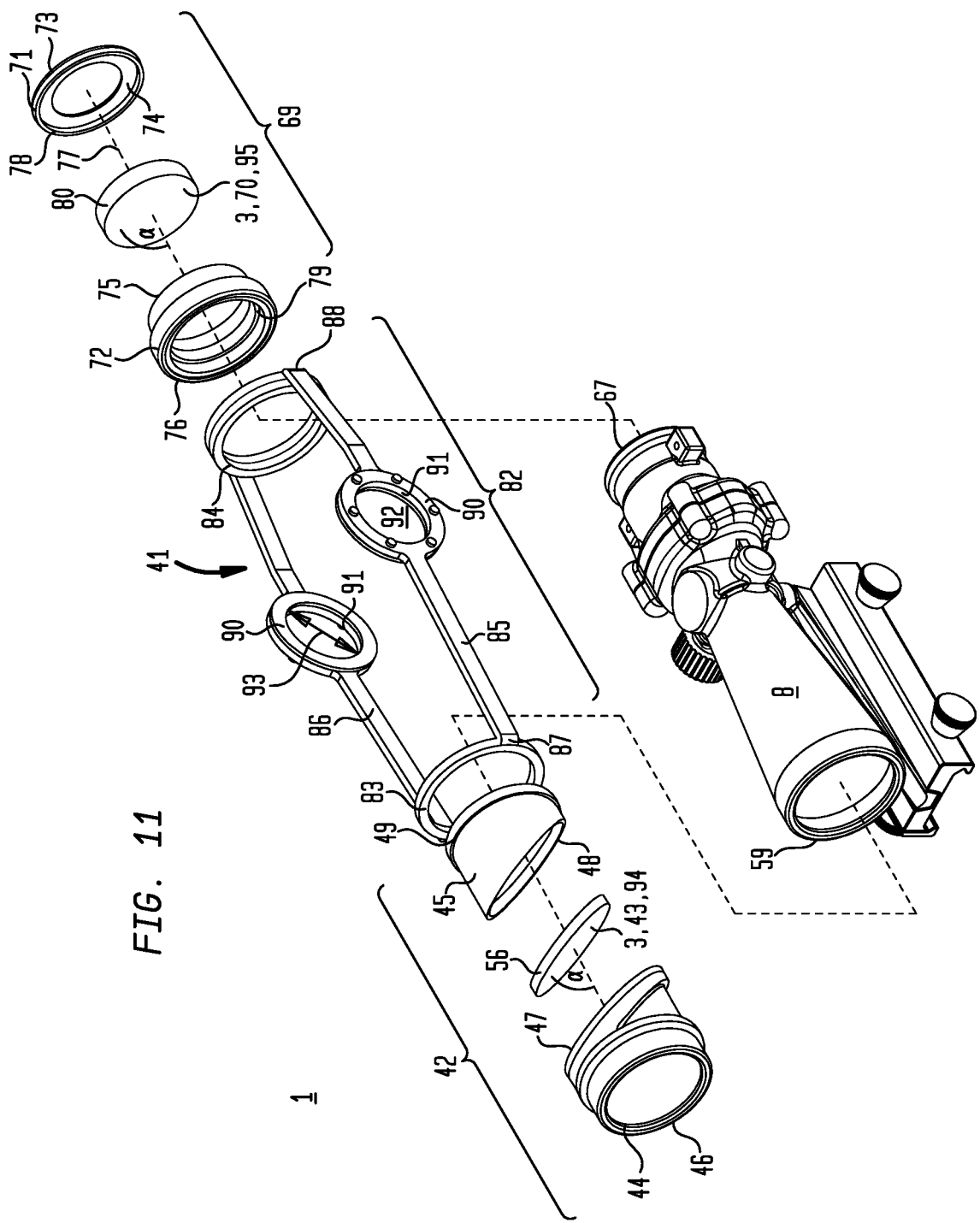
FIG. 11 is an exploded perspective view of the particular embodiment of the inventive sighting system including the retrofit system fitted to a scope as shown in FIG. 10.
Figure 12:
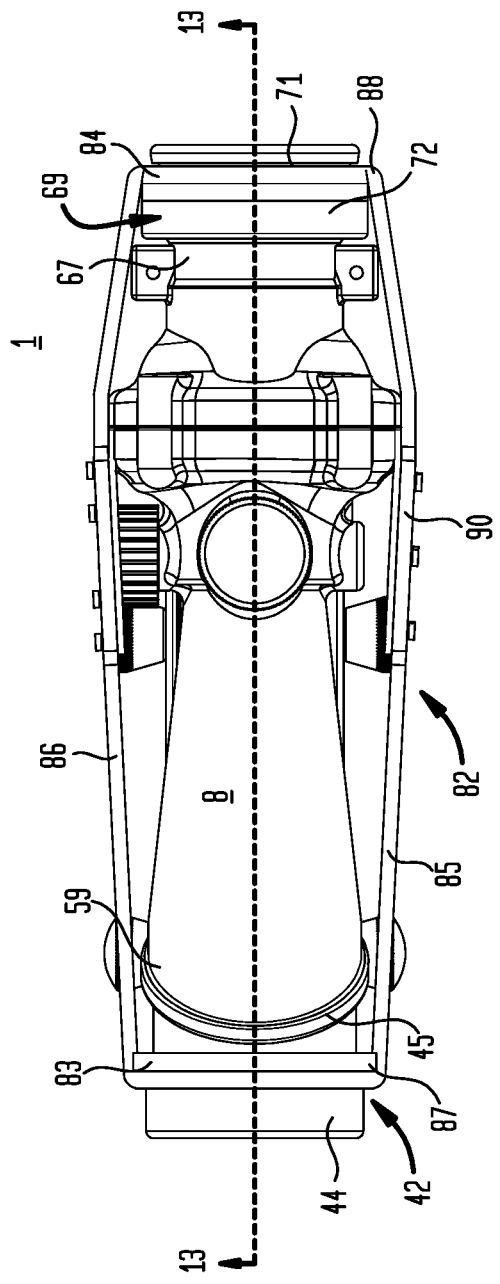
FIG. 12 is a top plan view of the particular embodiment of the inventive sighting system including the retrofit system shown in FIG. 10.
Figure 13:
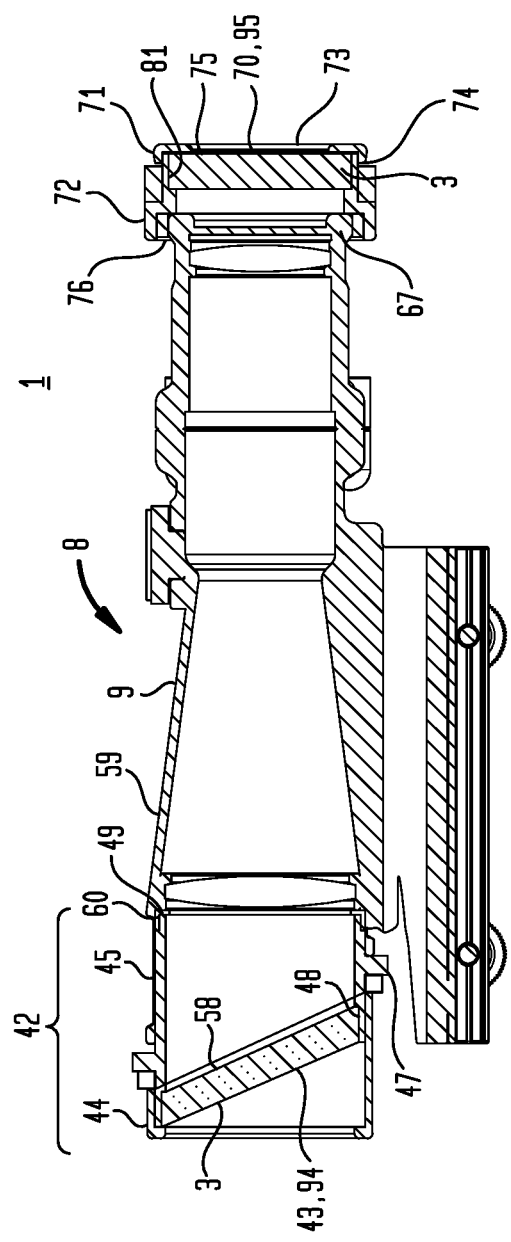
FIG. 13 is a cross section view 13-13 of the particular embodiment of the inventive sighting system including the retrofit system shown in FIG. 12.

Now referring primarily to FIGS. 7 and 9, the objective substrate (43) can be disposed between the first objective tubular housing (44) and the second objective tubular housing (45) at an angle (α), the angle (α) being described previously. In particular embodiments, the objective substrate (43) can be coupled to one or both of the first objective tubular housing (44) or the second objective tubular housing (45). As shown in the illustrative example of FIGS. 5 through 9, the objective substrate (43) can be disposed in an annular recess (54) disposed in the second objective tubular housing internal surface (55) configured to receive the objective substrate (43). The second objective tubular housing first end (48) can be sliding engaged with the first objective tubular housing second end (47) to enclose the objective substrate (43). In further particular embodiments, the objective substrate (43) can be secured to the first objective tubular housing (44) by applying adhesive to the objective substrate perimeter (56) and the first objective tubular housing inner wall (57), interference fit, mechanical fasteners, or the like. In particular embodiments, a first objective annular member (58) can be coupled between the first objective tubular housing (44) and the objective substrate (43). The first objective annular member (58) can be an elastomeric material capable of being reversibly deformed.

Now referring primarily to FIGS. 5 through 9 and 16, in particular embodiments, the objective substrate (43) can include a coating (4) including a plurality of layers (5), as above described.

Again, referring primarily to FIGS. 5 through 9, the second objective tubular housing second end (49) can be abutted to the distal end (59) of a scope (8). In particular embodiments, a second objective annular member (60) can be coupled between the distal end (59) of the scope (8) and the second objective tubular housing (45). The second objective annular member (60) can be an elastomeric material capable of being reversibly deformed.

The objective end (42) of the retrofit system (41) can be coupled to the scope (8) by an objective end retaining system (61). The objective end retaining system (61) can include an annular retaining element (62) and a pair of anchoring elements (63)(64). The first and second anchoring elements (63)(64) can be coupled to the external surface (65) of the first objective tubular housing (44). In particular embodiments, the first and second anchoring elements (63)(64) can be disposed in opposing relation. A first portion (66) of the annular retaining element (62) can be coupled to the first anchoring element (63). The annular retaining element (62) can be disposed about the proximal end (67) of the scope (8). A second portion (68) of the annular retaining element (62) can be coupled to the second anchoring element (64). The annular retaining element (62) can be an elastomer capable of being reversibly deformed. In particular embodiments, the annular retaining element (62) can, but need not necessarily, include a UV-resistant coating applied to the outer layer of the annular retaining element (62).

Now referring primarily to FIGS. 10 through 14, in particular embodiments, the retrofit system (41) can include an ocular end (69). The ocular end (69) can be disposed on the proximal end (67) of the scope (8). The ocular end (69) can include an ocular substrate (70), a first ocular tubular housing (71), and a second ocular tubular housing (72). The first ocular tubular housing (71) can have a length disposed between a first ocular tubular housing first end (73) and a first ocular tubular housing second end (74). The second ocular tubular housing (72) can have a length disposed between a second ocular tubular housing first end (75) and a second ocular tubular housing second end (76). The first ocular tubular housing (71) can be coupled to the second ocular tubular housing (72). The first ocular tubular housing (71) can be coupled to the second ocular tubular housing (72) by interference fit, mateable threads, mechanical fasteners, or the like. The ocular substrate (70) can be disposed between the first ocular tubular housing (71) and the second ocular tubular housing (72) at an angle (α) generally orthogonal to the longitudinal axis (77) of the ocular end (69); however, this is not intended to preclude embodiments in which the ocular substrate (70) has an angle (α) which is not orthogonal to the longitudinal axis of the ocular end (69), as above described. In particular embodiments, the ocular substrate (70) can be coupled to the first ocular tubular housing (71) or the second ocular tubular housing (72). The ocular substrate (70) can be coupled to the first or second ocular tubular housing (72)(73) by securing the ocular substrate (70) to the first or second ocular tubular housing internal surface (78)(79) by one or more of applying adhesive to the ocular substrate perimeter (80) and the first or second ocular tubular housing internal surface (78)(79), mechanical fixation, interference fit, or other like method of securing the ocular substrate (70) to the first or second ocular tubular housing internal surface (78)(79).

In the illustrative example of FIGS. 11 through 14, the ocular substrate (70) can be disposed between the first ocular tubular housing second end (74) and the second ocular tubular housing first end (75). The second ocular tubular housing first end (75) can include an annular recess (81) configured to receive the ocular substrate (70). The second ocular tubular housing first end (75) can be coupled to the first ocular tubular housing second end (74) to enclose the ocular substrate (70). The ocular substrate (70) can include a coating (4), as described above.

The ocular end (69) and the objective end (42) can be secured to the scope (8) by a retaining system (82). The retaining system (82) can include an objective securement member (83) and an ocular securement member (84). The objective securement member (83) can be coupled to the objective end (42) of the retrofit system (41). The ocular securement member (84) can be coupled to the ocular end (69) of the retrofit system (41). The objective securement member (83) and the ocular securement member (84) can be coupled to the objective end (42) and the ocular end (69), respectively, of the retrofit system (41) by mechanical fasteners, adhesives, mateable threads, interference fit, or other like methods, or combinations thereof. The objective securement member (83) and the ocular securement member (84) can be coupled by a pair of retaining members (85)(86). Each of the pair of retaining members (85)(86) can have a length disposed between a retaining member first end (87) and a retaining member second end (88). The retaining member first end (87) can be coupled to the objective securement member (83). The retaining member second end (88) can be coupled to the ocular securement member (84). In particular embodiments, either one or both of the pair of retaining members (85)(86) can further include an annular element (90) disposed along the length between the retaining member first end (87) and the retaining member second end (88). The annular element (90) can have an annular element inner wall (91). The annular element inner wall (91) can define an aperture (92). The aperture (92) can have a diameter (93) capable of receiving protrusions from the tubular housing (9) of the scope (8). In particular embodiments, the material of the pair of retaining members (85)(86) can be capable of elastic deformation and reformation.

The retrofit system (41) including an objective end (42) and an ocular end (69) can be coupled to the scope (8). The second objective tubular housing second end (49) can be disposed adjacent the distal end (59) of the scope (8). The pair of retaining members (85)(86) can be disposed about the scope (8). The second ocular tubular housing second end (76) can be disposed adjacent the proximal end (67) of the scope (8). Particular embodiments can further include one or more annular elements (90), protrusions from the tubular housing (9) of the scope (8) can pass through the one or more annular elements (90).

Again, referring generally to FIGS. 1 through 16, a method in a sighting system (1) can include transmitting incident light (6) along a sighting axis (2) which passes through a first substrate (94) of $SiO_2$ (19) having a coat (4) including a plurality of layers (5) including four or more of $Al_2O_3$ (27), $MgF_2$ (29), $HfO_2$ (28), $SiO_2$ (19) and $TiO_2$ (26) as above described, where the first substrate (94) can be disposed at an angle of about 90 degrees or at an angle of about 30 degrees to about 60 degrees in relation to the sighting axis (2). In particular embodiments, the method can further include transmitting incident light (6) along the sighting axis (2) which passes through a second substrate (95) optically coupled at a distance from the first substrate (94), where the second substrate (95) can have an angle of about 90 degrees in relation to the sighting axis (2), and where the first substrate (94) can have an angle of about 30 degrees to about 60 degrees in relation to the sighting axis (2). The second substrate (95) of $SiO_2$ (19) can have a coat (4) including a plurality of layers (5) as described above. In particular embodiments, the method can further include transmitting incident light (6) along a sighting axis (2) through first and second substrates (94)(95) disposed in a tubular housing (9) of a sighting system (1), as described above. The method can further include mounting the tubular housing (9) to a weapon (7). Additionally, the method can include aiming the weapon (7) by aligning the sighting axis (2) with a target (96).

As can be easily understood from the foregoing, the basic concepts of the present invention may be embodied in a variety of ways. The invention involves numerous and varied embodiments of a computer implemented proactive disease state management system and methods for making and using such computer implemented proactive disease state management system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "layer" should be understood to encompass disclosure of the act of "layering"—whether explicitly discussed or not—and, conversely, were there effectively disclosure of the act of "layering", such a disclosure should be understood to encompass disclosure of a "layer" or even a "means for layering." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result, i.e., the range of numeric values can be plus or minus 5% of the recited numeric value. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the devices including a sighting system including a substrate having a coating disposed at an angle in the sighting system herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A device, comprising:
   a first substrate of SiO2; and
   a plurality of layers disposed on said first substrate, said plurality of layers including four or more of Al2O3, MgF2, HfO2, SiO2 or TiO2;
   a second substrate optically coupled to said first substrate;
   a plurality of layers disposed on said second substrate, said plurality of layers including four or more of Al2O3, MgF2, HfO2, SiO2 or TiO2;
      wherein said first substrate disposed in spaced apart relation to said second substrate;
      wherein said first substrate disposed at an angle occurring in the range of about 30 degrees to about 60 degrees in relation to a sighting axis of said device; and
      wherein said second substrate disposed at an angle of 90 degrees in relation to said sighting axis of said device.

2. The device of claim 1, wherein said plurality of layers disposed on said substrate transmit incident light at about 400 nm to about 700 nm of greater than 98%.

3. The device of claim 1, wherein said plurality of layers disposed on said substrate transmit incident light at about 400 nm to about 700 nm of greater than 98.5%, of greater than 99.0%, or greater than 99.5%.

4. The device of claim 1, further comprising a tubular housing through which said sighting axis passes, said first and second substrate disposed a distance apart in said tubular housing.

5. The device of claim 4, wherein said first and second substrate each comprise a lens.

6. The device of claim 5, further comprising a housing mount coupled to said housing.

7. The device of claim 6, further comprising a weapon coupled to said housing mount.

8. A device, comprising:
   a first substrate; and
   a plurality of layers disposed on said first substrate, wherein said plurality of layers disposed on said first substrate including in an order comprising:
      a first layer of Al2O3 disposed on said substrate;
      a second layer of MgF2 disposed on said first layer;
      a third layer of HfO2 disposed on said second layer;
      a fourth layer of SiO2 disposed on said third layer;
      a fifth layer of Al2O3 disposed on said fourth layer;
      a sixth layer of TiO2 disposed on said fifth layer; and
      a seventh layer of SiO2 disposed on said sixth layer.

9. The device of claim 8, further comprising:
   a second substrate, wherein said plurality of layers disposed on said second substrate in an order comprising including:
      a first layer of Al2O3 disposed on said substrate;
      a second layer of MgF2 disposed on said first layer;
      a third layer of HfO2 disposed on said second layer;
      a fourth layer of SiO2 disposed on said third layer;
      a fifth layer of Al2O3 disposed on said fourth layer;
      a sixth layer of TiO2 disposed on said fifth layer; and
      a seventh layer of SiO2 disposed on said sixth layer.

10. A device, comprising:
    a substrate; and
    a plurality of layers disposed on said first substrate, wherein said plurality of layers disposed on said first substrate include comprising:
       a first layer of AL2O3;
       a second layer of MgF2;
       a third layer of HfO2; and
       a fourth layer of SiO2; and
       a fifth layer of Al2O3.

11. The device of claim 10, wherein said plurality of layers includes a sixth layer of TiO2 disposed on said fifth layer.

12. The device of claim 11, wherein said plurality of layers includes a seventh layer of SiO2 disposed on said sixth layer.

13. The device of claim 10, wherein said first layer having a thickness of about 93 nm to about 114 nm and a refractive index of about 1.5 to about 1.8.

14. The device of claim 13, wherein said second layer having a thickness of about 5.2 nm to about 6.3 nm and a refractive index of about 1.2 to about 1.5.

15. The device of claim 14, wherein said third layer having a thickness of about 18.0 nm to about 22.0 nm and a refractive index of about 1.7 to about 2.1.

16. The device of claim 15, wherein said fourth layer having a thickness of about 119.7 nm to about 146.3 nm and a refractive index of about 1.3 to about 1.6.

17. The device of claim 16 wherein said fifth layer having a thickness of about 50.3 nm to about 61.5 nm and a refractive index of about 1.5 to about 1.8.

18. The device of claim 17, wherein said sixth layer having a thickness of about 89.7 nm to about 109.6 nm and a refractive index of about 2.1 to about 2.6.

19. The device of claim 18, wherein said seventh layer having a thickness of about 75.4 nm to about 92.1 nm and a refractive index of about 1.3 to about 1.6.

* * * * *